May 10, 1927.　　　　　M. KARABIN ET AL　　　　　1,627,649
FLOWER HOLDER
Filed Aug. 21, 1926
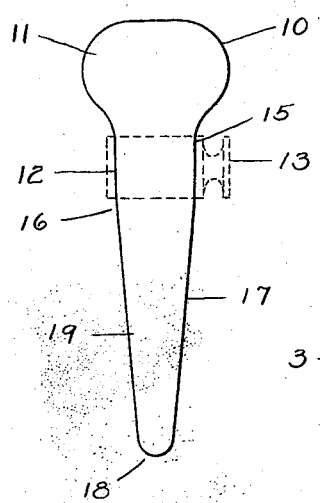
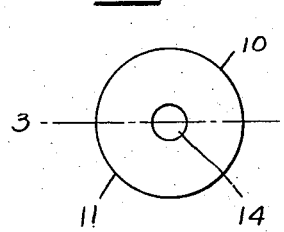
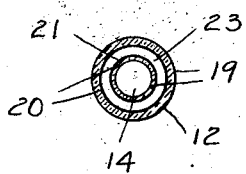
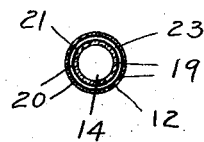
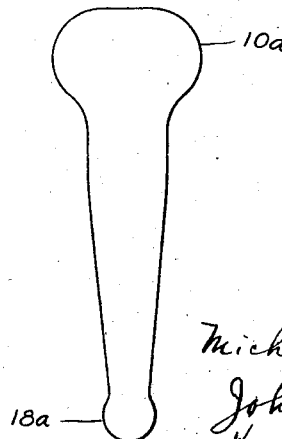
Inventors:
Michael Karabin,
John S Koczlek, and
Karl F. Mandl
Louis M. Schmidt Atty.

Patented May 10, 1927.

1,627,649

UNITED STATES PATENT OFFICE.

MICHAEL KARABIN, JOHN SKOCZLEK, AND KARL F. MANDL, OF NEW BRITAIN, CONNECTICUT.

FLOWER HOLDER.

Application filed August 21, 1926. Serial No. 130,692.

Our invention relates to improvements in flower holders, in the form of containers made of glass and used for holding cut-flowers, and particularly adapted for such use in the interiors of closed automobiles, and the object of our improvement is to produce a flower holder that is ornamental, neat, and attractive by reason of the form of the contour and also by having the exterior exposed surface of reflective character by the provision of a suitable coating of quicksilver such as is used in the backing of mirrors, and that has a double-walled structure for the well for the water and flower stems whereby there is relatively enhanced insulation with the resulting longer preservation of the flowers, and that, furthermore, may have the air removed from the space between the walls so as to further improve the flower-preserving qualities.

In the accompanying drawing:—

Figure 1 is a side elevation of our improved flower holder, the retaining bracket being indicated by means of broken lines.

Figure 2 is a plan view of the same.

Figure 3 is a sectional view on the line 3—3 of Fig. 2.

Figure 4 is a sectional view on the line 4—4 of Fig. 3, being through the body portion of the stem.

Figure 5 is a sectional view on the line 5—5 of Fig. 3, being through the tapered portion of the stem.

Figure 6 a side elevation of a modification showing a relatively enlarged ball at the bottom end.

Our improved flower holder 10 has as is the case with flower holders now in use a relatively enlarged upper end portion 11 that merges with a stem 12 that is a fit for a bracket 13 or the like for being supported from the wall in the interior of a closed automobile and has a well 14 for holding water and receiving the stems of the flowers.

In the present structure the upper end portion 11 is generally in the form of a spherical or ball-like structure, having a smooth and rounded periphery and at the lower end it merges with the cylindrical upper portion 15 of the stem 12.

Said cylindrical portion 15 merges at its lower end with the large upper end 16 of the lower tapered portion 17 of said stem 12.

The bottom tip end 18 in the form that is shown in Fig. 1 is of plain rounded form.

In the form that is shown in Fig. 6 the flower holder 10ᵃ has the bottom end structure 18ᵃ in the form of a relatively enlarged ball, a form that is better adapted to prevent injury by accidental contact therewith by an occupant of the automobile.

The exposed wall structure 19 is of reflective character, like a mirror, by reason of a coating 20 of the usual character that is used in making mirrors, such as to provide a layer of quicksilver, said coating 20 being indicated by a heavy line.

The structure described is such as to present a pleasing and attractive appearance due to the smooth form of the periphery, the details as to the form, and also to the mirror effect.

The well 14 is in the form of an elongated tube 21 that has the lower end 22 closed and is spaced from the outer exposed wall structure 19 and cooperates therewith to form a double-walled structure that confines the generally annular chamber 23.

The upper end portion 24 of the tube 21 is flared outwardly and merged with the structure of the ball 11.

Furthermore, the air is exhausted from the chamber 23.

As described, the structure is relatively light, involving the use of a minimum of glass, and at the same time is massive in appearance.

Also, improved insulating qualities are provided for the well so that the water contained therein and the flower stems will be retained at a relatively low temperature for an extended period of time.

The supporting bracket 13 engages with the flower holder structure adjacent the junction of the upper enlarged ball-like structure and the relatively reduced stem 12 and the exterior wall structure is made of material having sufficient thickness so as to provide the necessary strength for proper support under conditions of use. Such use involves more or less shaking and the like due to the movements of the automobile in which the device is installed.

We claim as our invention:—

A flower holder in the form of a double-walled structure made of glass, comprising an inner well in the form of an elongated tubular structure, an exterior wall connected by its upper end to said well and having the portion that is adjacent said upper end of relatively enlarged form, and a tip of rounded form at the lower end, and said exterior wall serving as a supporting wall in cooperation with a supporting bracket.

MICHAEL KARABIN.
JOHN SKOCZLEK.
KARL F. MANDL.